(No Model.) 2 Sheets—Sheet 2.
M. D. LEU.
DRESS CHART.
No. 595,239. Patented Dec. 7, 1897.
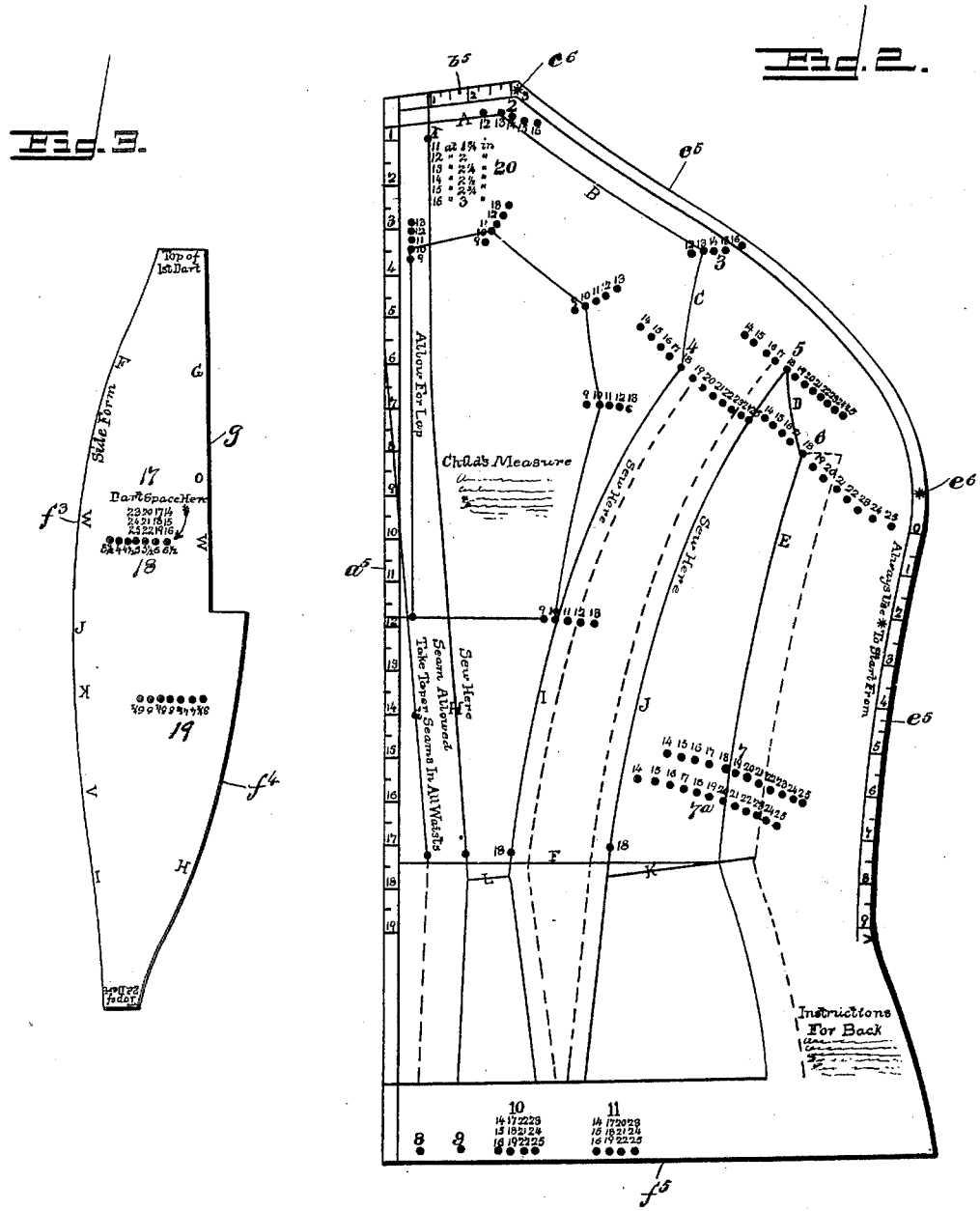
Witnesses
E. J. Stewart
J. B. Doyle
Inventor
Mary D. Leu
By her Attorneys,
C. A. Snow & Co.

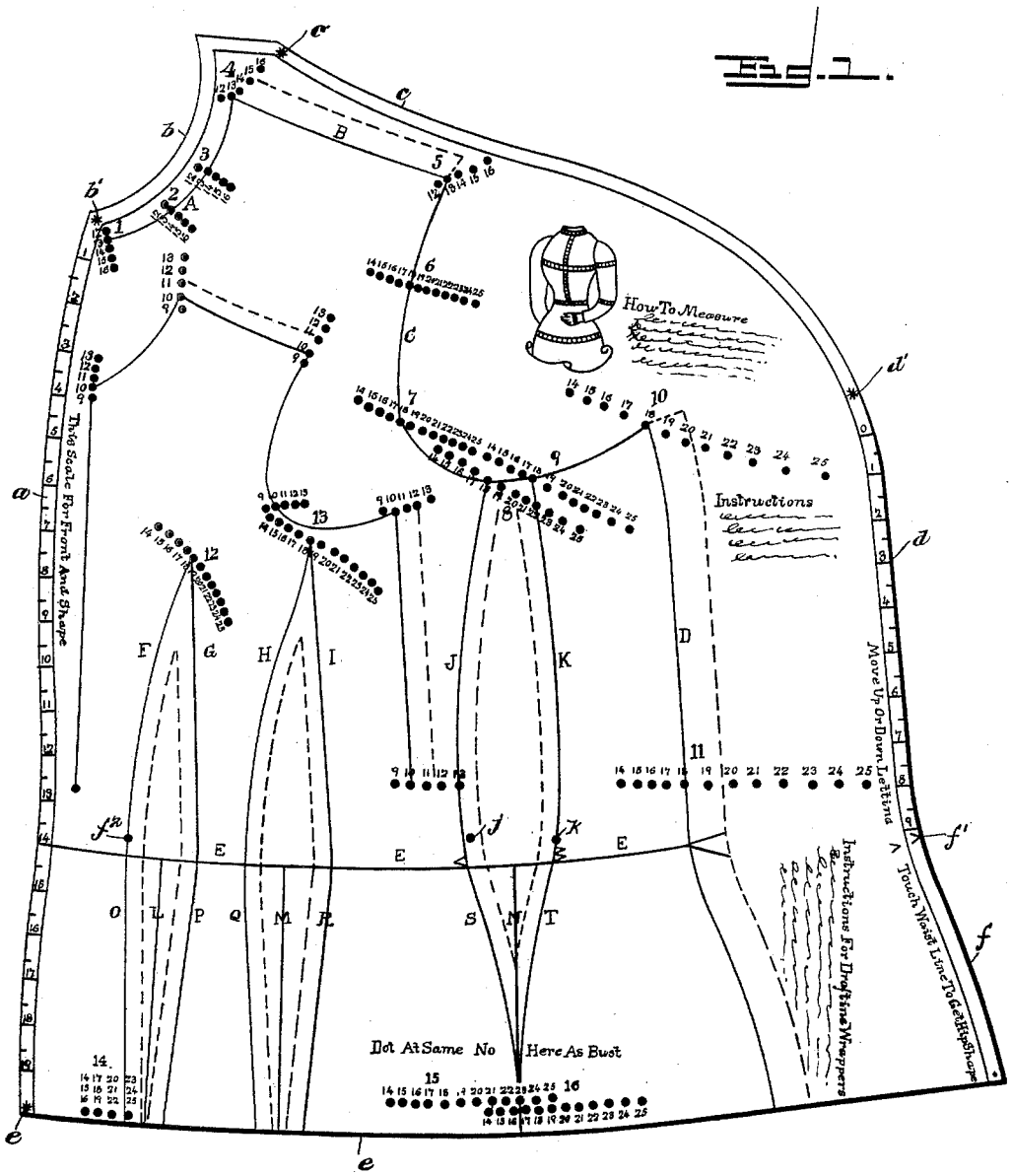

UNITED STATES PATENT OFFICE.

MARY D. LEU, OF WAUSEON, OHIO.

DRESS-CHART.

SPECIFICATION forming part of Letters Patent No. 595,239, dated December 7, 1897.

Application filed November 11, 1896. Serial No. 611,745. (No model.)

*To all whom it may concern:*

Be it known that I, MARY D. LEU, a citizen of the United States, residing at Wauseon, in the county of Fulton and State of Ohio, have invented a new and useful Dress-Chart, of which the following is a specification.

My invention relates to a dress-chart; and the object in view is to provide an improved construction and combination of chart members and rules for indicating accurate measurements upon the lining of the proposed garment, each chart member being provided with a plurality of scales arranged, respectively, upon lines governed by variations of proportion in the human form determined by experiment, and particularly to provide means for obtaining an accurate neck measure which is especially adapted for use in drafting garments for persons whose bust measure is above the average, it being well known that when the bust measure exceeds a certain limit an allowance must be made therefor in the neck measure. The larger the bust the more it is necessary to remove from the front at the neck.

Further objects and advantages of this invention will appear in the following description, and the novel features thereof will be particularly pointed out in the appended claims.

In the drawings, Figure 1 is a view of the front chart member, having measurements for laying out front and side forms. Fig. 2 is a view of the back chart member, having measurements for laying out the back and side-back forms. Fig. 3 is a view of a dart-rule employed in connection with the front and back chart members to lay off the lines thereof with the proper curves when the measurements have been indicated and also being provided with dart-rules for indicating the size of and intervals between the darts as controlled by the bust and waist measures.

Similar reference-characters indicate corresponding parts in all the figures of the drawings.

Referring first to the front chart member, it will be seen that it is provided with a front measure $a$, marked to indicate inches, and at its neck a plurality of neck-scales 1, 2, 3, and 4, radiating from the curved neck-rule $b$ and preferably ranging from "12" to "16," with perforations respectively contiguous to the numerals for use as hereinafter explained.

At 5 is shown a shoulder-scale, which also consists of numerals ranging from "12" to "16," and in use the numeral of this scale corresponding with the neck size is employed, said neck size being obtained by actual measurement. Thus the location of the neck-line A of the proposed garment is terminally indicated by the scales 1 and 4, while the divergence of the intermediate portion of the curve from a straight line is governed by the intermediate scales 2 and 3 and is adapted to be laid off by means of said neck-rule $b$, of which the initial point is the asterisk $b'$, and the shoulder-line B is terminally determined by means of scales 4 and 5, the extent of curvature being regulated by a shoulder-rule $c$, used as hereinafter explained and of which the initial point is the asterisk $c'$.

Scales 6, 7, 8, 9, 10, and 11, located, respectively, at different points on the armhole-curve C and near the lower end of the side-seam edge D range from "14" to "25," the numerals of these scales being, respectively, half of the bust measurement obtained by the ordinary methods. For instance, if the bust measurement is thirty-six the shape of the curve C is determined by extending the line through the perforations indicated by the numerals "18" of said scales 6 to 10, inclusive. The scale 11, which also ranges from "14" to "25," is regulated by the bust measure, and a numeral corresponding with one-half the bust measure indicates the position or direction of the line D. This side line is of curved construction and is adapted to be drawn by means of a side or under arm measure $d$, which also constitutes a rule of which the initial point is the asterisk $d'$. Thus the length of the line D is laid off by means of the measure $d$, according to the actual measurement of the under-arm seam. It should be noted, however, that while in laying off the measurement of the under-arm edge D the numeral on the scale $d$ corresponding with the accurate measurement of said seam is employed the length of the resulting line D is not equal to the measurement of the under-arm seam for the reason that the asterisk $d'$, which forms the initial point of the rule $d$, is spaced from the initial point of the measure $d$. This interval between the initial points of the rule and measure is an allowance made for the line D being in rear of the plane in which the direct under-arm measure is taken.

The waist-line E is governed in position by the front and under arm measurements, the former of which is laid off by means of the measure $a$ and the latter by means of measure $d$, and the curvature of said line is controlled by that of the rule $e$, of which the initial point is the asterisk $e'$. In continuation of the under-arm rule $d$ is a hip-rule $f$, of which the initial point is the carat $f'$, in operation said carat being arranged upon the lower extremity of the line D, which is of a length determined by the under-arm measurement.

At an intermediate part of the chart member are arranged upper-dart scales 12 and 13, of which the numerals range from "14" to "25," corresponding with the half-bust measurements upon which the scales 6 to 11 are constructed and which obviously are used in a corresponding manner. For instance, if the bust measurement is thirty-six inches the perforations indicated by the numerals "18" of the scales 12 and 13 are indicated. The front line F of the front dart is located by means of this numeral representing the half-bust measurement of the scale 12 and a corresponding numeral of the scale 14, the dot $f^2$ contiguous to the lower end of the line F being formed while the chart member is in the position which it assumes during the drawing of the line E when the asterisk $e'$ is upon the point indicated by the front measurement taken on the scale $a$, and the edge $e$ is upon the lower end of the under-arm line D. In the same way while the chart member is in this position—namely, for drawing the line E, which is made upon a curvature corresponding with that of the rule $e$—the scales 15 and 16, which are also located near the rule $e$, are used to indicate points $j$ and $k$, said scales 15 and 16 being in proportion to the bust measurements and ranging from "14" to "25." Hence in use the dots $j$ and $k$ are made at points indicated by the numerals in the scales 15 and 16 representing the half-bust measurement.

Having the desired point in the scale 12 and the point $f^2$ contiguous to the line E, the front line of the front or first dart F G is laid off by means of a dart-rule (shown in Fig. 3) and marked at its opposite extremities with the words "Top of first dart" and "Top of second dart" to indicate the position of the rule. The line F of the front-form pattern is laid off by means of the curved edge $f^3$ of the dart-rule, that portion of said edge $f^3$ which is indicated upon the dart-rule by the letter F being used. Each line of the chart member which is adapted to be drawn by means of an edge or a portion of an edge of the dart-rule is indicated by a capital letter, and that portion of the edge of the dart-rule which is to be employed in drawing that particular line of the chart member is inscribed with a corresponding capital letter. Thus the straight line G, forming the rear side of the front dart, is drawn by means of the straight-edge $g$ of the dart-rule, after the width of the first dart has been obtained, by means of a dart-scale 18, containing numerals "$3\frac{1}{2}$," "4," "$4\frac{1}{2}$," "5," &c., to "$6\frac{1}{2}$." In order to obtain the proper point of this scale, a dot is made at the perforation of scale 18 opposite the numeral representing the difference between the half-waist measurement and the half-bust measurement, said dot being made before the rule is moved after drawing front-dart line F. For instance, if the half waist and bust measurements are respectively thirteen and eighteen the dot is made at perforation 5 of the scale 18.

To find the width between darts, a perforation opposite the half-bust measurement in scale 17 is arranged at the lower end of line G, and a mark for lower end of line H is made at the edge $g$ of dart-rule opposite the letter W on said edge. Having obtained the location of the lower end of the line H, and the upper end thereof being determined by the numeral in the scale 13 corresponding with the one-half bust measurement, said line H is drawn by means of the curved edge $f^4$ of the dart-rule, that portion of said edge $f^4$ which is indicated by the letter H being employed. To determine the width of the second dart, a numeral corresponding with that employed in the scale 18 is used in the auxiliary scale 19. For instance, if the width of first dart as laid off by the scale 18 is five, this being the difference between the one-half waist and one-half bust measurements, the width of the second dart is regulated by the numeral "5" of the scale 19, after which the line I is drawn by means of the portion of the edge $f^3$, which forms one side of the dart-rule.

By means of the scales 15 and 16, as hereinbefore described, we have located the lower ends of the lines J and K by means of dots $j$ and $k$, the upper ends of said lines being located, respectively, by the half-bust-measurement numerals of the scales 8 and 9, and in order to draw the lines mentioned the dart-rule is employed, the line J being formed by that portion of the edge $f^3$ of the dart-rule which is indicated by the letter J and the line K being drawn by that portion of the same edge $f^3$ which is indicated by the letter K. It will be seen that the dart-rule is reversed in order to make these lines. In order to accurately determine the positions of the dart-rule, respectively, in drawing the lines J and K, I have arranged letters V and W, respectively, at the lower ends thereof, at their intersection with the waist-line E, and have placed corresponding letters V and W upon the edge $f^3$ of the dart-rule, said letters of the dart-rule being adapted to be arranged contiguous, respectively, to the corresponding letters at the lower ends of the lines J and K of the chart when said lines are drawn in order to secure the proper curvature of the latter.

The lines L, M, and N are drawn perpendicularly from the contiguous portions of the line E at the centers of the dart-spaces and at the interval between the lower ends of the lines J and K, after which the lines O, P, Q, R, S, and T are drawn, the lines O to R, inclusive, being drawn by means of the straight-edge $g$, to indicate which the letter O is arranged contiguous to said straight-edge, while the lines S and T are drawn by any suitable curved portion of the dart-rule.

In order to lay off the front and side form patterns by means of this chart member, place the latter on the lining, leaving room at the front for a hem, and draw a line from 7 on the front measure $a$ to the bottom of the chart member. Then, without moving the chart member, indicate the neck measure by dotting through the perforations corresponding therewith in the scales 1, 2, 3, 4, and 5. Then using one-half of the bust size dot at the proper numerals in the scales 6, 7, 8, 9, 10, 11, 12, and 13. Now move the chart member and place asterisk $b'$ at dot made at the scale 1, letting the front edge of the chart member touch the upper end of the front line drawn, as above described, from the numeral "7" of the measure to the bottom of the chart member and finish said front line. At the same time mark the length of the waist down the front by means of the measure $a$. Now draw lines A, B, C, and D, using the asterisks $b'$, $c'$, and $d'$ simply for their respective lines, the curve of the line C being sufficiently determined by the scales 6 to 10 employed in connection therewith. To draw the waist-line E, place the asterisk $e'$ at the front-length measurement, letting the rule $e$ touch the waist-length under arm on the line D. Before removing the chart member dot at the scales 14, 15, and 16. Now remove the chart member and use the dart-rule for laying off the darts, as hereinbefore described.

The back chart member illustrated in Fig. 2 is provided with a back measure $a^5$, a starting-point 1, and a series of scales 2 and 3, which range from "12" to "16" and are adapted to be used according to the neck measurement, and scales 4, 5, 6, and 7, ranging from "14" to "25" and adapted to be used in accordance with the bust measurements, as described hereinbefore with regard to the front chart member. The upper edge of the back chart member is constructed to form a neck-rule $b^5$, and contiguous thereto is a shoulder-rule $c^5$, of which the initial point is an asterisk $c^6$. Also the edge of the chart member opposite to that bearing the measure $a^5$ is provided with a side measure $e^5$, having its initial point indicated by the asterisk $e^6$, this edge also forming a rule by which the line E may be drawn. The location of the line A is determined by means of the rule $b^5$ and of the line B by means of the proper numerals of the scales 2 and 3 when the chart member is arranged with the asterisk $c^6$ at said numeral of the scale 2 and the edge $c^5$ touching the proper numeral of the scale 3. In the same way the line C is determined by the locations of the proper measurement numerals of the scales 3 and 4 and the lines D and E by means of the numerals of the scales 5 and 6 and 6 and 7, respectively. Having drawn the line E by means of the rule $e^5$ and at the same time indicated the length of said line E by means of the measure contiguous to the edge, the length of this line being determined by the under-arm measurement, the chart member is moved to arrange its lower edge, which forms a rule $f^5$ at the lower extremity of the line E, the rear edge bearing the measure $a^5$ being arranged at the fold of the lining which is being laid off, and the line F is drawn. Before moving the chart member dots are made at 8, 9, 10, and 11, 9 being employed to determine the lower end of the stitching-line of the back form, 10 the width of the lower end of the back form, which is determined by the bust measure, a numeral corresponding with the half-bust measurement being selected. Having determined the location of the lower end of the line H, said line is drawn by means of the straight-edge at $a^5$ through the first dot made at 1, and a second line G may be drawn at an interval from the line H through dot made at 8 to indicate the cutting-line. Also by means of the dart-rule the lines I and J may be drawn to connect the dots formed by means of the scales 10 and 11 contiguous to the line F with the dots formed by means of the scales 4 and 5, the portion of the edge $f^3$ of said dart-rule marked "side form" being employed for this purpose.

As above indicated, the line F is drawn perpendicular to the fold formed in the lining to enable the latter to be laid out in duplicate and does not represent the waist-line. Before starting from the waist measurement on the line E inclined lines K and L are now formed, which decline toward the rear lines J and H, respectively, of the side-back and back forms, the declination of these lines varying from one-fourth inch to one inch, according to the form of the person being fitted. Having determined the positions of these lines K and L, the edge $a^5$ is placed upon the line H, with the accurate back-seam measurement upon the intersection of the line H with the line L, and a line is drawn by means of the edge $b^5$, starting from the line H and of a length determined by the scale 20. If the measurement of the neck is twelve inches, the length of the line formed by means of the edge $b^5$ is made two inches, or is extended to the numeral "2" upon said edge, and if the neck measurement is thirteen inches said line is extended to the point "2¼" of said edge.

Thus while the lines A and B are first laid off by means of the point 1 and the scales 2 and 3 it will be seen that after the position of the waist-line has been determined and the inclination of the back seam, which is regulated by the line H, a secondary or true neck-line is determined by accurate measurement of the back seam taken from said waist-line L, which is arranged above the longitudinal line A, and the measurement of the neck-line by means of the measure $b^5$ is determined by means of the scale 20, which differs in length from the longitudinal line A, the end of this true neck-line being then connected with the proper numeral representing the neck measure on the scale 3 to determine the shoulder-line, and this difference between the true positions of the neck and shoulder lines and the lines A and B as originally laid off constitutes an allowance for variations in the positions of said lines according to the bust measurement. In practice it is necessary after laying off the neck and shoulder lines to make this allowance for the bust measurement, the allowance being greater as the size of the bust increases. Ordinarily these lines are determined by experiment; but by the use of the neck measure $b^5$ and the relative scale 20, which is employed in connection therewith, I am enabled to determine these lines accurately and thereby secure a perfect-fitting neck without experiment or without the "fitting" common in this art to determine the height and relative positions of the neck and shoulder lines. This relation between the neck and shoulder lines and the bust measurement is due to the fact that as the size of the bust increases the shoulder-line is raised, and hence alters the proportion which normally exists between the shoulder-line and the size of the neck as laid off originally by means of the initial point 1 and the scales 2 and 3. I have found in practice that in order to obtain this accurate location of the lines for the neck and shoulder it is necessary to first lay off the other lines of the pattern, which are controlled by the bust measure, and thus fix the waist-line, after which by means of the said measure $b^5$ and scale 20 the positions of the neck and shoulder lines may be ascertained.

In addition to the scales above described I employ a scale $7^a$ on the back chart member contiguous to and below the scale 7 for determining the position of the under-arm line E of the side-back form in drafting patterns for wrappers and similar loose garments or where a very tapering waist is encountered, the numerals of said scale ranging from "14" to "25," as in the contiguous scale 7, and the selected numeral thereof being one-half the bust measurement, as hereinbefore explained in connection with the use of the scale 7.

Within the space inclosed by the front and back forms I also arrange child's front and back forms, which are laid out according to rules corresponding with those above described.

A further object of the above-described construction resides in the fact that the positions and widths of both darts in the front form and the interval therebetween vary with the bust and waist measurements, whereby the proportions are suited to the garment which is being laid out, no points being fixed for all sizes.

From the above description it will be seen that an important improvement of the dress-chart embodying my invention resides in the provision of a neck-rule $b$, having a fixed initial point indicated by a character, as an asterisk $b'$, in connection with neck-scales 1, 2, and 3, which radiate from the curve of said neck-rule respectively at the lower terminal and at two intermediate points, the perforations of said scales being designated by characters representing different neck measurements.

Another important improvement in the dress-chart embodying my invention resides in the arrangement upon a single chart member of a plurality of forms arranged in the proper relative positions and adapted to be laid off upon a pattern or dress-lining simultaneously—as, for instance, the front and side forms upon the front chart member and the back and side-back forms upon the back chart member—thus enabling the material to be cut economically, enabling certain scales on the chart member to be used mutually in connection with both forms arranged thereon to simplify the use of the chart and to adapt the edges of the chart member to be used as rules in laying off the lines of the forms after the measurements or terminals of those lines have been indicated to establish the positions thereof. The dart-rule is employed to lay off the inner lines of the forms, including the dart-lines.

A further important improvement in the dress-chart embodying my invention resides in the use of scales 12 and 13 for indicating the upper ends or points of the first and second darts and in providing for use in connection with the front chart member a dart-rule having its edges constructed to form dart-lines and provided with transverse scales which are supplied with characters respectively proportionate to bust measurements and to differences between bust and waist measurements, whereby the widths and intervals between the darts are not determined arbitrarily, but depend upon absolute measurements, and also whereby the widths and intervals between the darts do not depend solely upon the bust measurement, but also in part upon the waist measurement, whereby the width is not made in a certain definite ratio to the length or height, but is varied to suit the waist measurement, and therefore is adapted to suit different degrees of stoutness and slimness.

A further important improvement of the dress-chart embodying my invention resides in the provision of the back chart member with arbitrarily-determined points 8 and 9, arranged near a waist-rule disposed perpendicular to a back measure, in connection with a neck-rule $b^5$, of which the proper graduation is selected in accordance with an arbitrary table based upon neck measurements, whereby the waist-line is determined in position by the side measurement, which in turn of course depends upon preliminary neck, shoulder, and armhole measurements, while the back measurement is laid off by using said waist-line as an initial point to determine the accurate position of the neck-line. In other words, in order to lay off a neck-line which is proportionate to the bust measurement, (this being necessary by reason of the neck-line being governed to a certain extent by the bust measurement, particularly when the latter exceeds a given limit,) it is necessary to assume preliminary neck and shoulder lines and from them work around the chart through the armhole, side, waist, and back measurements to establish the correct neck and shoulder lines. The means which I have adopted to secure these correct neck and shoulder lines enable me to attain a neck and shoulder fit where the bust exceeds a certain limit, which heretofore have been attainable only by trial or experiment with each particular subject or by making a pattern in accordance with the established rules and then "trying on" the pattern and fitting the same by experiment.

A further improvement of the dress-chart embodying my invention resides in the fact that the lines of a pattern connecting points of measurement in the several scales are indicated by reference-characters having their duplicates upon the several edge-rules of said chart members and of the dart-rule, whereby the operator is enabled to apply the proper portions of the edges of the chart members and dart-rule to the points determined by the selected numerals of the scales in order to secure the proper curvature of the lines in the resulting pattern.

Having described my invention, what I claim is—

1. A dress-chart having a front chart member provided with a curved neck-rule having an initial point designated by a suitable character, and a plurality of neck-scales radiating from the curve of said neck-rule, respectively at the lower extremity or initial point of the rule and at intermediate points thereof, substantially as specified.

2. In a dress-chart, the combination with a front chart member having scales 12 and 13 for determining the positions of the upper ends or points of the darts to agree with the bust measurement, of a dart-rule having curved and straight edges for laying off the dart-lines, and provided with transverse scales 17, 18 and 19 for determining the widths and intervals between the darts proportionate to the front-form scales, substantially as specified.

3. In a dress-chart, the combination with a front chart member having scales 12 and 13 for determining the positions of the upper ends or points of the darts to agree with the bust measurement, of a dart-rule having curved and straight edges for laying off the dart-lines and provided with a scale 17 graduated in accordance with bust measurements to determine the width of the first dart, a scale 18 of which the numerals represent the difference between waist and bust measurements to determine the interval between the darts proportionately to said measurements, and a scale 19 relative to the scale 18 for determining the width of the second dart, substantially as specified.

4. A dress-chart having a back chart member provided with a back measure $a^5$, an initial point 1 set back the distance of a seam-lap from the back measure, a scale 2 arranged relatively to the point 1 to determine a preliminary neck-line and the point of intersection of a preliminary shoulder-line with said neck-line, other scales for determining the positions and lengths of shoulder, armhole, side, and waist lines, and a neck measure $b^5$, intersecting and having an initial point coincidental with that of the back measure, for determining the position and length of the rectified neck-line and the position of the upper end of the shoulder-line, from the upper end of the back-line, determined in position at its lower end by the waist-line measurement and measured through the said point 1, substantially as specified.

5. A dress-chart having a back chart member provided with a waist-rule, an intersecting back-rule, a point 1 offset from the upper end of the back-rule, a point 9 contiguous to the waist-rule and offset from the back-rule, and a graduated neck-rule $b^5$ intersecting the back-rule at its upper end, the back measurement being made upon a line through the points 9 and 1, and the neck-line being laid off by means of the neck measurement when the back-rule is positioned by means of said points 9 and 1, substantially as specified.

In testimony that I claim the foregoing as my own I have hereto affixed my signature in the presence of two witnesses.

MARY D. LEU.

Witnesses:
Mrs. F. R. SMALLMAN,
Mrs. ANNA HAYNES.